Dec. 17, 1935. A. B. RAY Re. 19,791
APPARATUS FOR TREATING GASES
Original Filed Feb. 7, 1928
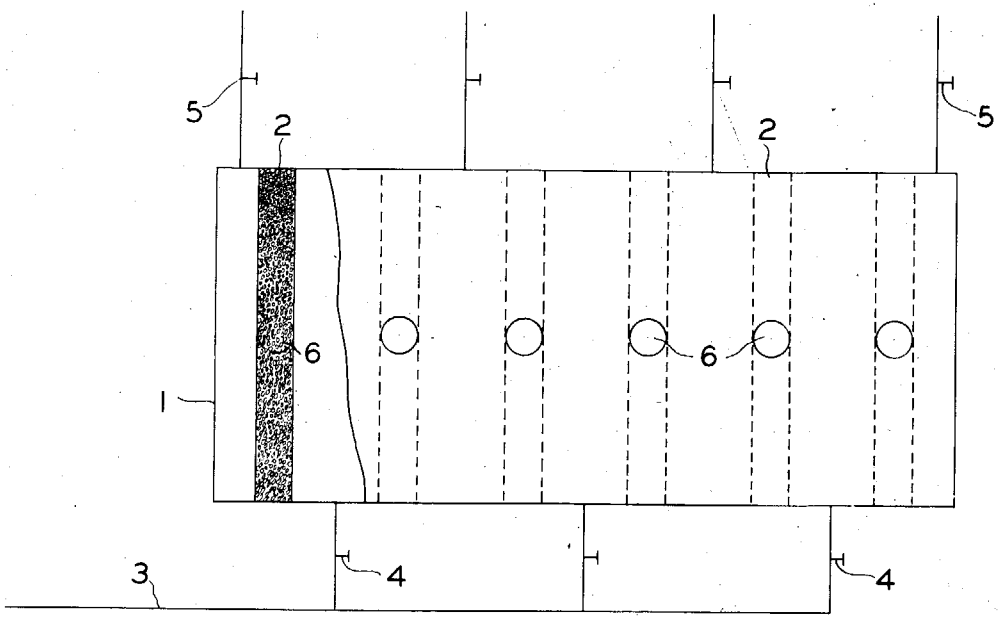
INVENTOR:
Arthur B. Ray,
BY
Byron Townsend & Brickenstein,
ATTORNEYS.

Reissued Dec. 17, 1935 Re. 19,791

UNITED STATES PATENT OFFICE 19,791

APPARATUS FOR TREATING GASES

Arthur B. Ray, Bayside, N. Y., assignor to National Carbon Company, Inc., a corporation of New York Original No. 1,820,030, dated August 25, 1931, Serial No. 252,654, February 7, 1928. Application for reissue August 12, 1933, Serial No. 684,907

4 Claims. (Cl. 183—4)

This invention relates to apparatus for treating gases to remove substances therefrom.

The substances to be removed are usually in a gaseous and vapor state, and mixed with the gas to be treated. In certain instances substances may be removed from gases and recovered because of their valuable nature, such as solvents used in industrial processes which vaporize in air; and in other instances substances are removed from gases because they are injurious, odoriferous, and objectionable.

It is particularly desirable to treat air discharged from meat packing houses, where the waste material from butchered animals is treated for commercial disposal, because the air becomes contaminated with objectionable odors. Much progress has been made in the abatement of the more serious of the stenches which were formerly emitted from the parts of meat packing houses in which the waste animal matter is treated. For example, the fat is now rendered from the non-edible portions of the carcasses in closed kettles, and means is provided for condensing a considerable portion of the obnoxious odors emitted. In this manner, one of the principal sources of atmosphere contamination is removed to a great extent. Some of the fixed gaseous odors, however, still escape from the rendering apparatus into the surrounding room. Also, materials of objectionable odor are still handled in open vessels, as when the offal is being macerated, washed, and charged into the rendering kettles, and when the cooked material is discharged from the kettles. In this manner, the very large volumes of air which pass through the work rooms become contaminated with a relatively small but offensive content of odoriferous substances.

The use of closed vessels for the more objectionable stench-producing operations brought about so much improvement that, for a time, there was a tendency to tolerate the less serious stenches still emitted. As sanitary standards have been raised, however, and, as residence districts have drawn closer to existing plants of this character, the necessity for more complete stench abatement has become acute. No means has heretofore been available for this purpose, primarily because of the large volumes of air which must be deodorized to render a plant quite unobjectionable.

In accordance with the present invention, the substances are removed from the gases by contacting the latter with granular activated carbon. Although I do not wish to be limited thereto, I prefer to employ the activated carbon materials described in the U. S. patents to Newcomb K. Chaney No. 1,497,543 and No. 1,497,544, both dated June 10, 1924, and I prefer to use the more active of the materials which are there described.

In order to process the large volumes of air discharged from a meat packing plant in an apparatus of reasonable size, it is apparent that the air must flow through the deodorizing apparatus at high velocity. To force the air at high velocity through beds of granular carbon requires high pressures and large expediture of power unless the carbon beds are very thin. Thin carbon beds in conjunction with a high air velocity reduce the time of contact of the air with the carbon to a very small interval, and it was questionable whether, under economically feasible conditions, the air would be sufficiently deodorized. In this connection the low concentration of odoriferous substances in the air entering the purifying apparatus is less significant than the much lower concentration of residual odors which must be attained in the air leaving the apparatus. The concentrations of the substances dealt with are infinitesimal as compared with the concentrations of gasoline, solvent vapors and other materials remaining in gases after they have been passed through activated carbon in prior processes. Even where activated carbon is used in gas masks, the velocity of the air through the carbon does not approach that necessary in the deodorization of the air from certain sections of meat packing houses. Nevertheless, I have been able to completely deodorize contaminated air from packing houses with great success by the use of the apparatus now to be described.

Reference is to be made to the accompanying drawing in which the single figure is a top view of a suitable odor-removing apparatus with one end cut away to show the interior construction.

In this drawing I show an enclosed vessel, such as a steel tank 1, the interior of which is divided into a number of compartments solely by thin vertical layers 2 of activated carbon held in place by any suitable means, such as perforated metal plates, screens, or permeable material in sheet-like form, a face of each bed being exposed to the face of an adjacent bed. The odor-laden air is passed by a suitable blower into the air duct 3 and thence through the inlet valves 4 into the interior of the tank. The outlet valves 5 on the opposite side of the tank are so arranged with reference to the inlet valves that all of the air must pass through one or more layers of activated carbon before it is finally released to the atmosphere. Preferably the air passes through but one layer of carbon. Suitable openings 6 are provided on the top and bottom of each of the carbon containers for charging and discharging as desired.

After the carbon has been in service for several months and its deodorizing power has become nearly exhausted, one bed of carbon at a time may be removed from the tank and revivified. During this time the necessary valves leading to and from the proper section of the tank are closed so that no odor-laden air can escape to the atmosphere. After one batch of carbon has been revivified it is again placed in the tank and another batch is removed for revivification, so that the continuous operation of the deodorizing process is not hindered. A satisfactory method of revivifying the carbon is to heat it with steam to a temperature of about 300° C. If objectionable materials are driven out of the carbon by the steam, they may be partially condensed and passed with the water condensate into the sewer or burned.

The particular location of the apparatus in the plant is a matter of convenience, but it is advisable to place it so that the carbon may be removed when necessary for revivifying with the least possible effort. The discharge holes for the respective beds are so arranged that the carbon may be passed from the vertical containers by gravity directly into the revivifying tank, or onto a suitable conveyor for transferring it to said tank. The apparatus of my invention may of course be used in conjunction with other odor abatement apparatus. For example, in cases where spray chambers are already in use, my apparatus may be used in series with it, and the exhaust air from the spray chamber passed directly into contact with the carbon where the deodorizing operation is completed. By previously spraying the air with water it appears that ammonia, dust, and possibly some of the volatile odoriferous compounds are removed and the active life of the carbon may thus be considerably prolonged.

While convenient for some purposes, it is not absolutely necessary to enclose the carbon beds in a metal container, since the main object of the apparatus is to insure passage of the odor-laden air through the activated carbon. For instance, the thin vertical beds of cabon may be placed in a brick chamber or an ordinary room and all of the air from the work rooms passed into this chamber or treating room, and thence by suitable dampers through the layers of activated carbon and into the atmosphere.

In determining the amount of activated carbon necessary for completely removing substances from a gas, such as in the deodorizing of air, consideration must be given to the volume of gas which it is necessary to treat per minute with a view to the fact that the thickness and area of the carbon bed will determine the power required to force the gas through it. I have found that with beds varying from 4 to 8 inches in thickness air may be passed through the beds at a linear velocity of 50 to 100 feet per minute without excessive pressure, and with complete removal of the substances.

In a particular application of the present invention in which air discharged from a meat packing house is deodorized, approximately 30,000 cubic feet of the odor-laden air per minute are passed by two suction blowers into the apparatus. The thickness of the carbon bed which it is feasible to use under these conditions is about 6 inches, and the linear velocity through the bed for effective removal of odors is approximately 50 feet per minute. In order to obtain this velocity a total carbon bed area of about 600 square feet must be provided. With this total area divided into smaller beds and arranged as already described, the pressure drop through the activated carbon will be approximately equivalent to 3 inches of water.

The ability of activated carbon to adsorb various gases, vapors and other substances is well known, but under the conditions as described I believe that the actual adsorptive power of the carbon is not entirely responsible for the results obtained. It has been observed and is disclosed in the patents and literature that activated carbon acts as a catalyst in certain reactions, and the ease with which many odoriferous compounds may be oxidized has long been recognized. I therefore believe that the remarkable efficiency of the carbon for the purpose in question, in which the conditions for adsorption are decidedly unfavorable, may be attributed in some cases in part to its catalytic action by which the odoriferous material is actually oxidized and destroyed.

So far as I am aware my apparatus is the first to be designed to meet the combination of requirements which includes the treatment of very large volumes of gas in inexpensive equipment, a small expenditure of power, and substantially complete removal of a volatile impurity from the gas. For such purposes a bed of granular carbon of a thickness small in comparison with its area, and sufficiently small to permit the passage of gas with a velocity of at least 50 feet per minute under a pressure equivalent to 3 inches of water has unique advantages.

While I have described my invention as being particularly adaptable for use in meat packing houses, it is to be understood that with slight modifications the same apparatus can be used for practically any odor abatement purposes requiring the purification of large volumes of air or other gases. It would likewise be useful in removing substances other than odors which are present in small concentration in various manufacturing operations where such substances are mixed with air or other gases.

I claim:

1. In an odor removing apparatus of the character described comprising a tank, the interior of which is separated into a plurality of compartments by means of thin vertical beds of activated carbon arranged in spaced relation therein, inlet valves for the air to be treated connected with alternate compartments, the air admitted into the alternate compartments dividing and flowing through adjacent beds of carbon, outlet valves connected with the remaining compartments, and means provided for individually charging and discharging each of said carbon beds by gravity.

2. In a system for preventing the dissemination of odors in large volumes of air, the combination of a container, a plurality of thin vertical beds of activated carbon arranged in spaced relation in said container and separating the container into a plurality of compartments, inlet valves on one side of said container, outlet valves on the opposite side thereof, said valves being connected to the compartments in a manner whereby the air admitted into alternate compartments divides and flows through adjacent beds of carbon before being released to the atmosphere, and means provided for individually charging and discharging each carbon bed by gravity.

3. Apparatus for removing an odoriferous substance from air comprising a container, a plurality of thin vertical beds of activated carbon arranged in spaced relation in said container with a face of each bed exposed to the face of an adjacent bed, means for admitting air containing the substance into alternate spaces formed between said carbon beds, the air admitted into the alternate spaces dividing and flowing through adjacent beds of carbon, means for discharging air from the spaces between those spaces into which air is admitted, and means provided for individually charging and discharging each of said carbon beds by gravity.

4. Apparatus for removing odoriferous substances from large volumes of air, comprising the combination of a tank having end walls, a series of thin vertical beds of activated carbon arranged in spaced relation in said tank, the end beds being spaced from said end walls and said series of beds constituting the sole means for separating said tank into alternate inlet and outlet chambers, means for admitting odor-laden air into the inlet chambers, the air admitted to such inlet chambers dividing and flowing through adjacent carbon beds, means for discharging deodorized air from the outlet chambers, and means provided for individually charging and discharging each of said carbon beds by gravity.

ARTHUR B. RAY.